(12) United States Patent
Lee et al.

(10) Patent No.: US 7,909,250 B2
(45) Date of Patent: Mar. 22, 2011

(54) MEMORY CARD SLOT DOOR UNIT AND DIGITAL MOBILE APPARATUS HAVING THE SAME

(75) Inventors: Dong-seok Lee, Seoul (KR); Sang-ki Min, Hwaseong-si (KR); Kyoung-jin Ahn, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1004 days.

(21) Appl. No.: 11/430,850

(22) Filed: May 10, 2006

(65) Prior Publication Data

US 2007/0001003 A1    Jan. 4, 2007

(30) Foreign Application Priority Data

Jun. 30, 2005    (KR) .................. 10-2005-0057942

(51) Int. Cl.
*G06K 7/00*    (2006.01)
(52) U.S. Cl. ........................ 235/435; 235/375
(58) Field of Classification Search ............... 235/435, 235/375; 348/373
See application file for complete search history.

(56) References Cited

U.S. PATENT DOCUMENTS

| 5,179,504 | A | 1/1993 | Kitahara |
| 2001/0008581 | A1* | 7/2001 | Fuchimukai .................. 396/321 |
| 2005/0094027 | A1* | 5/2005 | Kano et al. .................... 348/362 |

FOREIGN PATENT DOCUMENTS

| JP | 3106787 | 11/1991 |
| JP | 09-048482 | 2/1997 |
| JP | 10-011553 | 1/1998 |
| JP | 10-171553 | 6/1998 |
| JP | 10-326386 | 12/1998 |
| JP | 2001-067441 | 3/2001 |
| JP | 2002-008356 | 1/2002 |
| JP | 2004-007214 | 1/2004 |
| KR | 20-0357053 | 7/2004 |

* cited by examiner

*Primary Examiner* — Edwyn Labaze
(74) *Attorney, Agent, or Firm* — Roylance, Abrams, Berdo & Goodman, L.L.P.

(57) ABSTRACT

A memory card slot door unit selectively opens and closes an entrance of a memory card slot used in a digital mobile apparatus. The memory card slot door unit includes a door for closing an entrance of a memory card slot. A plurality of hinges supporting a pivoting motion of the door against lateral walls of the memory card slot, so that the door selectively opens and closes the entrance of the memory card slot.

24 Claims, 8 Drawing Sheets

MEMORY CARD SLOT DOOR UNIT AND DIGITAL MOBILE APPARATUS HAVING THE SAME

CROSS-REFERENCE TO RELATED APPLICATIONS

This application claims the benefit under 35 U.S.C. §119 (a) of Korean Patent Application No. 2005-57942, filed on Jun. 30, 2005, the entire contents of which are hereby incorporated by reference.

BACKGROUND OF THE INVENTION

1. Field of the Invention

The present invention relates in general to a memory card slot. More specifically, the present invention relates to a memory card slot door unit for opening and closing an entrance of the memory card slot, and a digital mobile apparatus having the same.

2. Description of the Related Art

Generally, a digital mobile apparatus, such as a digital camera, a digital camcorder, a cellular phone, a portable game machine, and so forth, uses a portable memory as a storage medium for expanding the storage capacity of data, including still images and moving images.

A portable memory typically looks like a card and is inserted into a memory card slot in a digital mobile apparatus. Examples of the portable memory include a MMC (multimedia card), a memory stick, an SD (secure digital) card, and so forth. The memory card slot secures an inserted memory card, and serves to electrically connect the memory card to a controller in a digital mobile apparatus. Therefore, when a memory card is inserted in the memory card slot, the controller of the digital mobile apparatus stores data in the memory card or reads data from the memory card.

However, if the entrance of the memory card slot is not covered, the memory card sometimes slips away from the memory card slot in the middle of usage of a digital mobile apparatus or while being carried. To prevent this kind of incident, the entrance of the memory card slot needs to be covered. For instance, a memory card slot door may be installed at the entrance of the memory card slot to allow a user to selectively open or close the memory card slot.

There are a number of conventional ways to close the memory card slot. One of them is to use a door to block an entrance of the memory card slot. More specifically, the door is disposed at a longer side of the memory card slot parallel to the entrance of the memory card slot and pivotably supported by a hinge that has a hinge shaft having a length corresponding to the length of the memory card slot. The door is pivoted on the hinge, thereby selectively opening and blocking the entrance of the memory card slot. However, a drawback of this structure is that the hinge needs an installation space approximately similar to or larger than an area of the entrance of the memory card slot. Therefore, it is difficult to manufacture compact-sized digital mobile apparatuses. That is, a digital mobile apparatus with the above-described memory card slot door is too big for a user to use or carry around.

Therefore, it is necessary to develop a small-sized memory card slot door capable of selectively opening and closing the memory card slot.

SUMMARY OF THE INVENTION

An object of exemplary embodiments of the present invention is to provide a small-sized memory card slot door unit capable of selectively opening and closing a memory card slot, and a digital mobile apparatus having the same.

A memory card slot door unit includes a door for closing an entrance of a memory card slot. A plurality of hinges support a pivoting motion of the door against lateral walls of the memory card slot, so that the door selectively opens and closes the entrance of the memory card slot.

Preferably, the memory card slot door unit further includes a door holder, which is installed at a front end portion of the entrance of the memory card slot and has a lead-in opening through which the memory card is inserted in the memory card slot.

The plurality of hinges are installed on lateral walls of the door holder.

Preferably, the door includes a blocking plate for blocking the lead-in opening of the door holder. A plurality of pivoting arms extend from both ends of the blocking plate, and are installed pivotably on the lateral walls of the door holder by the plurality of hinges.

An inner side of the door holder is molded in a shape corresponding to the memory card that is inserted in the memory card slot.

The memory card slot door unit further includes a plurality of position maintaining members, each being installed at one side of each of the plurality of hinges for elastically pressing the hinge unit of the door. Preferably, the plurality of position maintaining members are formed in one body.

Preferably, the hinge unit of the door includes a first fixing part coming in contact with the position maintaining members in an opened state, and a second fixing part coming in contact with the position maintaining members in a closed state.

Another aspect of the present invention provides a digital mobile apparatus including a main body, a display unit pivotably installed at one side of the main body, and a memory card slot with an inner side being in contact with a mounting portion of the main body where the display unit is mounted. A memory card slot door unit is installed at an entrance of the memory card slot for selectively opening and closing the entrance of the memory card slot.

Preferably, the memory card slot door unit includes a door holder installed at the entrance of the memory card slot, and having a lead-in opening through which the memory card is inserted in the memory card slot. A door blocks the lead-in opening of the door holder. A plurality of hinges support the pivoting motion of the door with respect to the door holder so that the door selectively opens and closes the lead-in opening.

Preferably, the memory card slot door unit further includes position maintaining members installed at one side of the plurality of hinges for elastically pressing the hinge unit of the door.

The hinge unit of the door includes a first fixing part coming in contact with the position maintaining members in an opened state, and a second fixing part coming in contact with the position maintaining members in a closed state.

The door includes a blocking plate for blocking the lead-in opening of the door holder. A plurality of pivoting arms extend from both ends of the blocking plate, and are pivotably installed on the lateral walls of the door holder by the plurality of hinges.

Preferably, the door holder and the door are fixed to the main body by the plurality of hinges.

As explained above, the memory card slot door unit used in a digital mobile apparatus is capable of opening and closing the memory card slot by means of a door. Therefore, when a user carries around the digital mobile apparatus, the memory card is not easily removed away from the memory card slot.

In addition, the small-sized memory card slot door unit of the present invention reduces the overall size of the digital mobile apparatus.

Also, a digital mobile device using the memory card slot door unit according to the present invention may adopt a hinge-pivoting door if the memory card slot is arranged between a display unit (that is, a Liquid Crystal Display (LCD)) and a main body of the digital mobile device.

Even though the memory card slot door unit may be installed between the display unit and main body of a digital mobile apparatus equipped with the memory card slot door unit of the present invention, no interference is made to a locking member for the door and the display unit.

Furthermore, a digital mobile apparatus having the memory card slot door unit of the present invention may accommodate various types of memory cards, simply by replacing a door holder used for the memory card slot door unit.

Other objects, advantages, and salient features of the invention will become apparent from the detailed description, which, taken in conjunction with the annexed drawings, discloses preferred exemplary embodiments of the invention.

BRIEF DESCRIPTION OF THE DRAWINGS

The above aspects and features of the present invention will be more apparent by describing certain exemplary embodiments of the present invention with reference to the accompanying drawings, in which.

Throughout the drawings, like reference numerals will be understood to refer to like parts, components and structures.

DETAILED DESCRIPTION OF EXEMPLARY EMBODIMENTS

An exemplary embodiment of digital mobile apparatus equipped with a memory card slot door unit of the present invention is described herein below with reference to the accompanying drawings. Although digital mobile apparatuses include digital cameras, digital camcorders, cellular phones, and so forth, a digital camcorder is used for purposes of the description of an exemplary embodiment of the present invention. Therefore, it should be noted that the digital mobile apparatus mentioned hereafter refers to a digital camcorder.

Figure 1:
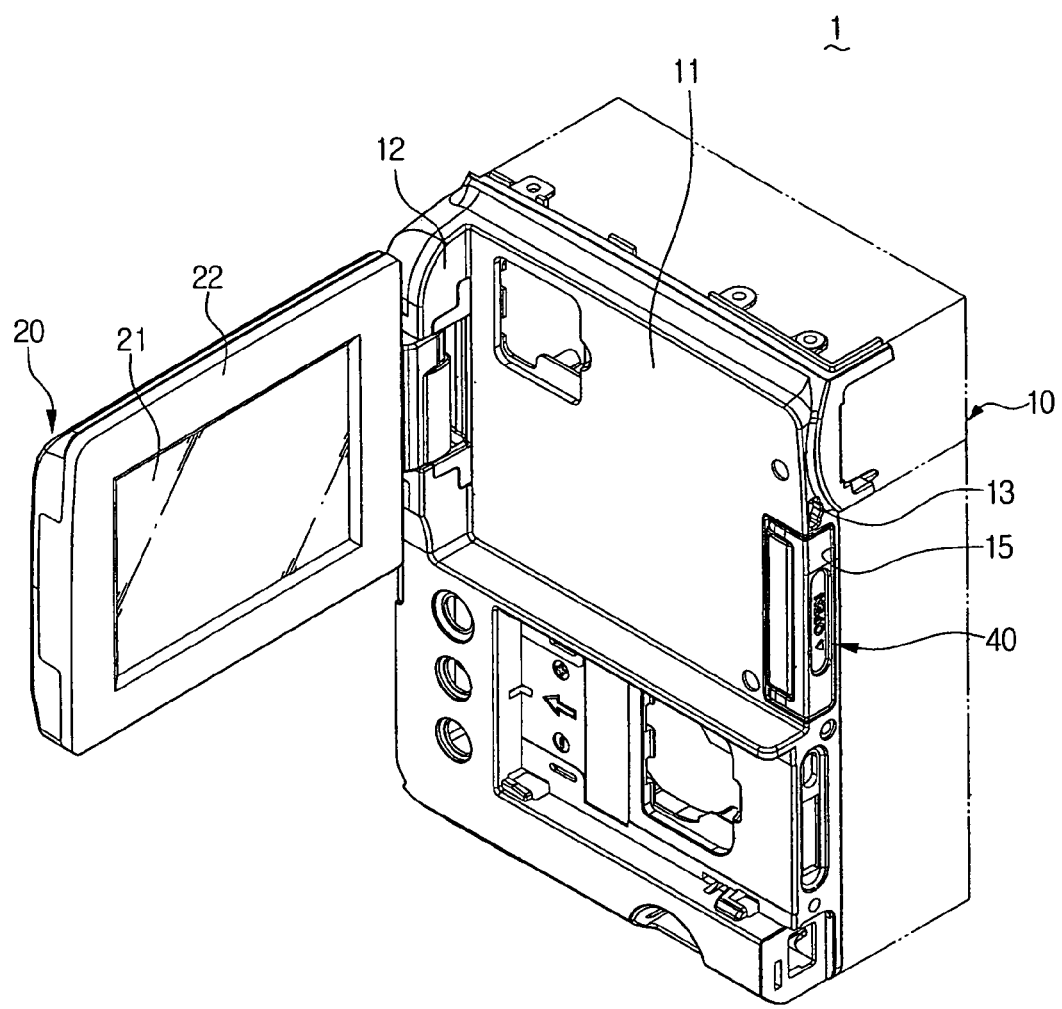
FIG. 1 is a schematic perspective view of a digital mobile apparatus equipped with a memory card slot door unit according to an exemplary embodiment of the present invention.
Figure 2:
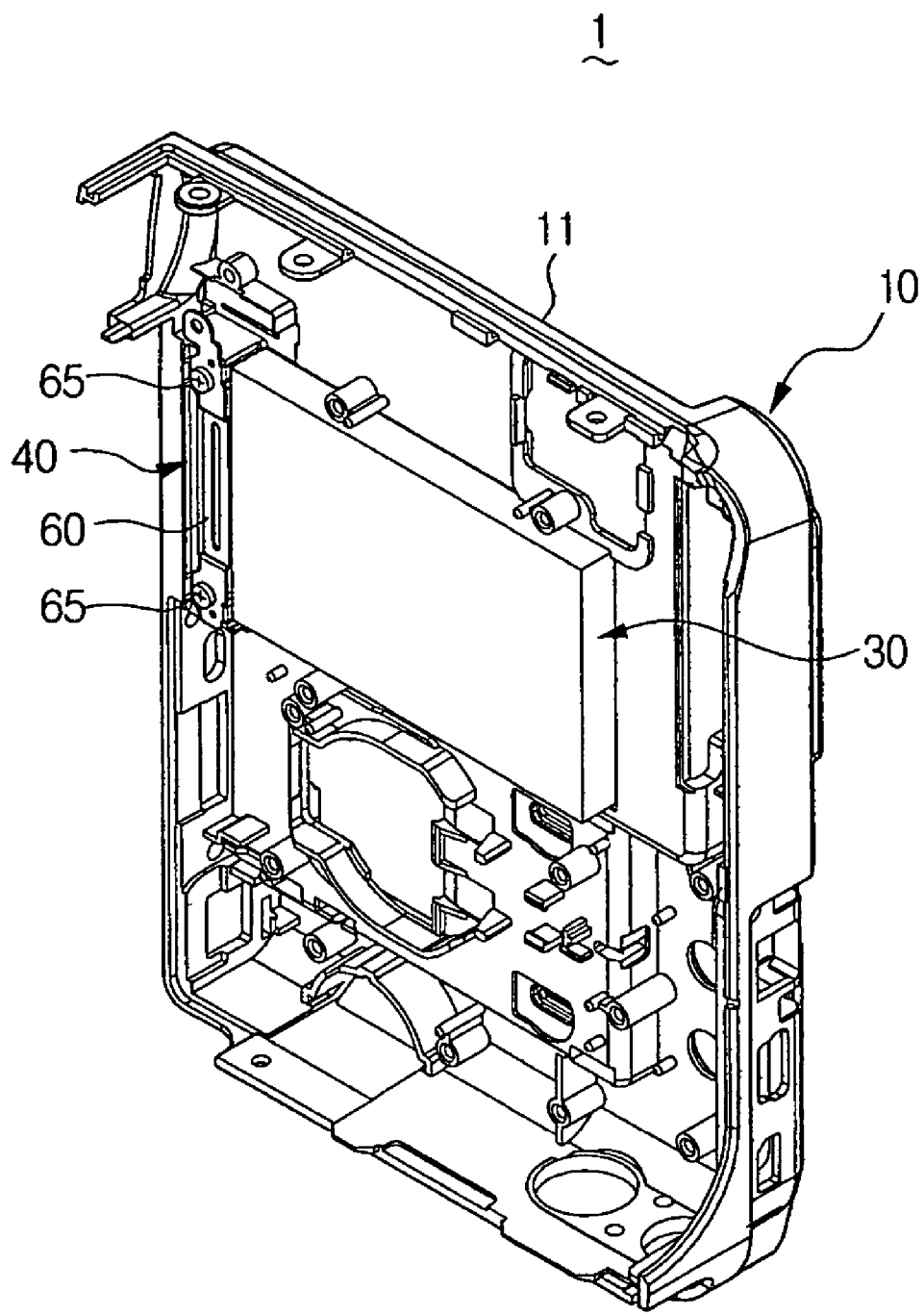
FIG. 2 is a partial perspective view of a main body of a digital mobile apparatus of FIG. 1.

Referring to FIGS. 1 and 2, a digital mobile apparatus 1 according to an exemplary embodiment of the present invention includes a main body 10, a display unit 20, a memory card slot 30, and a memory card slot door unit 40.

The main body 10 has a mounting portion 11 to which the display unit 20 is mounted. The mounting portion 11 has a shape corresponding to the display unit 20, and is recessed from on one side of the main body 10 by a predetermine depth. The main body 10, although not illustrated, includes components, such as, a camera unit for obtaining video data, a view finder through which a user (photographer) looks to compose the scene, a recording and reproducing device for recording and reproducing video data, and a controller for controlling these components. Since the technical configuration of the main body 10 is substantially similar to that of a conventional camcorder, a detailed explanation thereof is omitted.

The display unit 20 is installed rotatably at a lateral side 12 of the mounting portion 11 of the main body 10, and includes a frame 22 for supporting a display 21. The display 21 displays video data photographed by a camera unit (not shown), or video data reproduced from a storage medium (not shown). An LCD is preferably used as the display 21. Moreover, a locking member 13 for securely locking the display unit 20 to the main body 10 is installed at one side of the main body 10 near the memory card slot door unit 40.

Figure 5:
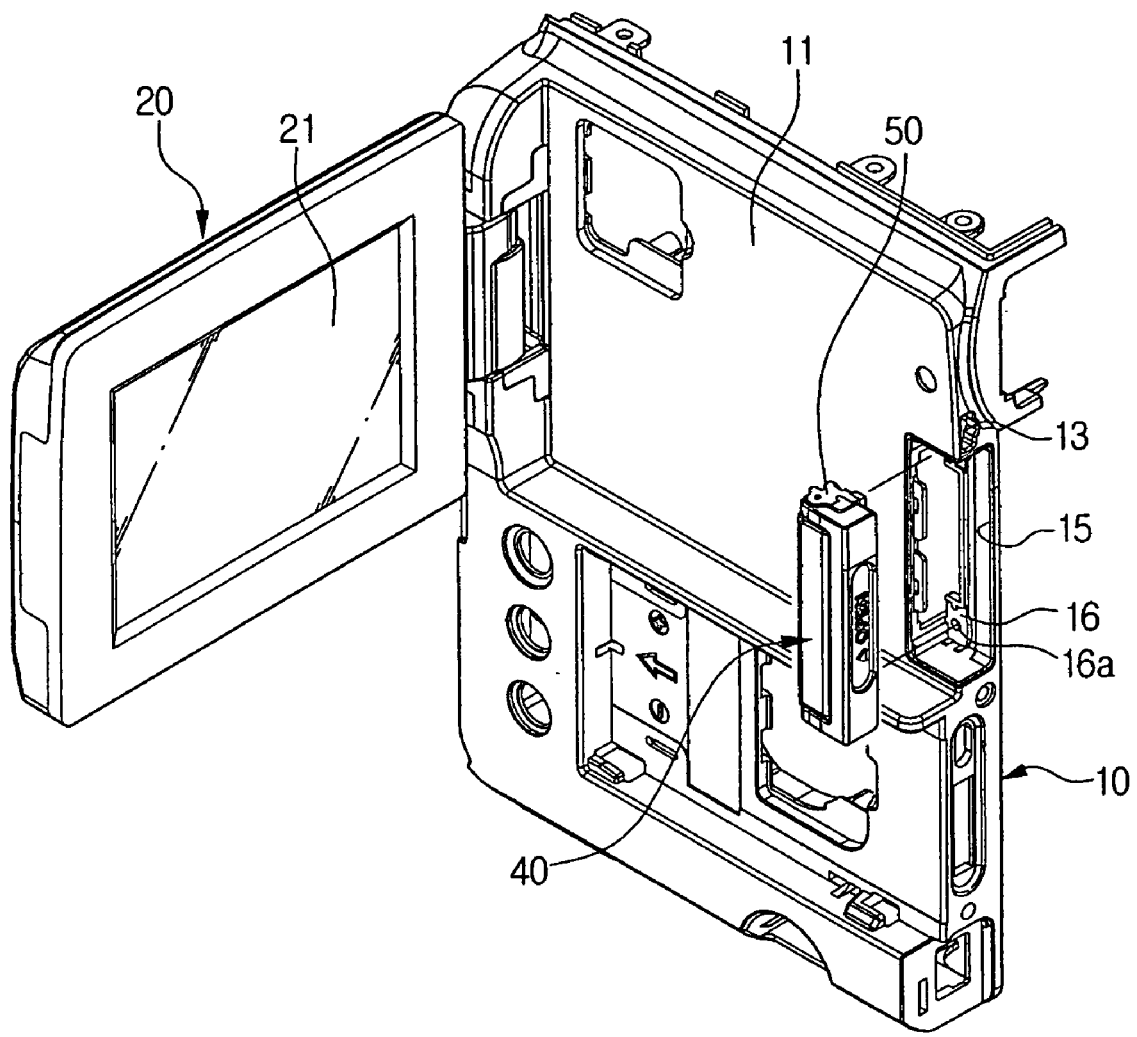
FIG. 5 is an exploded perspective view of a memory card slot door unit according to an exemplary embodiment of the present invention prior to being connected to the main body of a digital mobile apparatus.

The memory card slot 30 is also installed at the main body 10. A memory card for expanding the storage capacity is selectively inserted in the memory card slot 30. To reduce the overall size of the digital mobile apparatus 1, the memory card slot 30 is preferably disposed below the mounting portion 1. That is, the memory card slot 30 is installed to contact to side inner walls of the main body 10 forming the mounting portion 11. Moreover, an opening 15 is formed in the wall of the main body 10 corresponding to an entrance of the memory card slot 30 (as shown in FIGS. 1 and 5). The memory card slot 30 may be formed exclusively for a specific type of memory card, or may be formed as a multi-slot for various types of memory cards, including an MMC, SD card, memory stick, and so forth. The memory card slot 30 secures a memory card inserted therein, and electrically connects the memory card to a controller (not shown) of the digital mobile apparatus 1. Thus, the controller is able to store video data photographed by the camera unit in the memory card, or to display video data stored in the memory card through the display 21. Because the technical configuration of such memory card slot 30 is substantially similar to that of a conventional memory card slot, a detailed explanation thereof is omitted.

The memory card slot door unit 40 is installed at the opening 15 (as shown in FIGS. 1 and 5) of the main body 10 to communicate with an entrance of the memory card slot 30, and to selectively open and close the entrance of the memory card slot 30.

Figure 3:
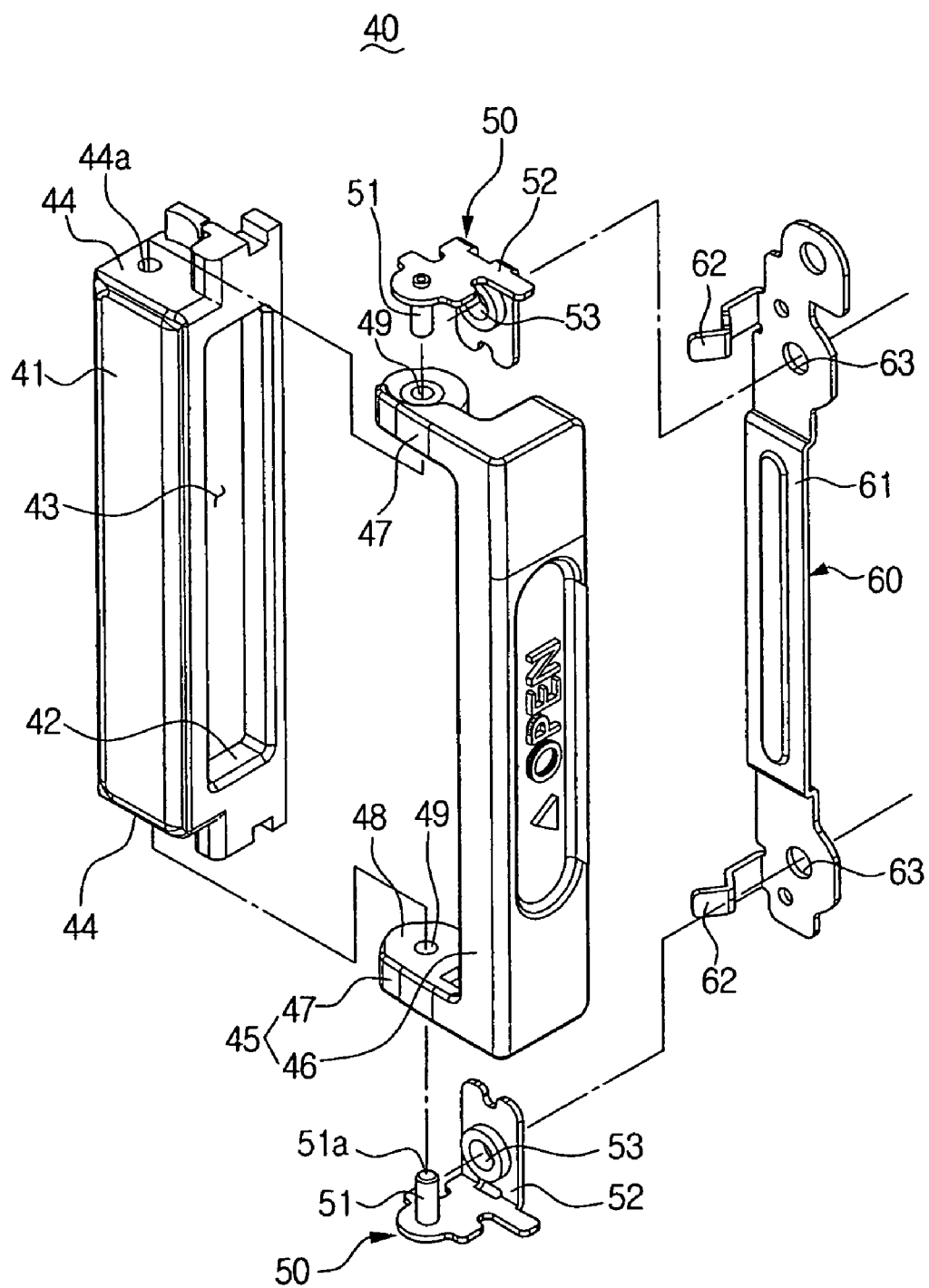
FIG. 3 is an exploded perspective view of a memory card slot door unit according to an exemplary embodiment of the present invention.

Referring to FIG. 3, the memory card slot door unit 40 according to one exemplary embodiment of the present invention includes a door holder 41, a door 45, two hinges 50, and a position maintaining member 60.

The door holder 41 is installed at the entrance of the memory card slot 30 in communication with the memory card slot 30. The door holder 41 has a shape substantially corresponding to a memory card. Considering that memory cards are typically rectangular plates, the door holder 41 is formed in a substantially rectangular shape such that a user may put a memory card therein or remove a memory card from the slot.

Figure 4:
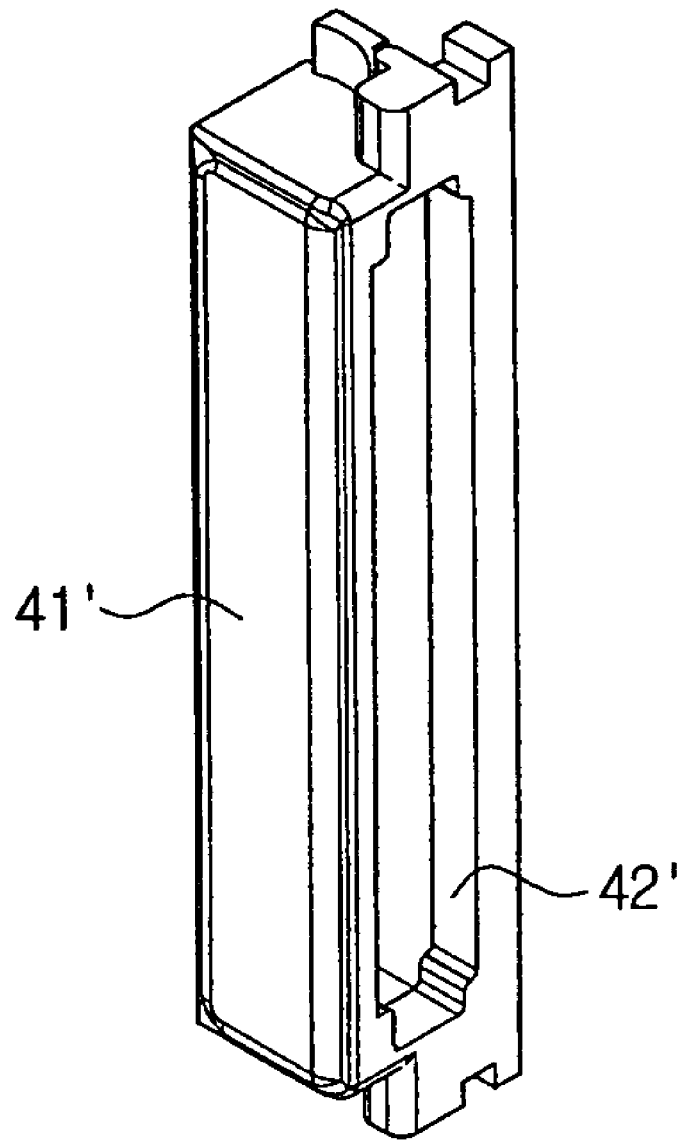
FIG. 4 is a perspective view of a memory card slot door holder according to another exemplary embodiment of the present invention.

An inner side 42 of the door holder 41 is molded in a shape substantially corresponding to the memory card being used. Particularly, as illustrated in FIG. 3, an exemplary embodiment of the door holder is a multi-slot adaptive to various types of memory cards (for example, MMC, SD card, memory stick, and so forth). As illustrated in FIG. 4, an exemplary embodiment of a door holder 41' with an inner side 42' is formed substantially corresponding to a slot exclusively for a memory stick. On the lateral walls 44 of the door holder 41 are formed supporting holes 44a into which the hinge shafts 51 of the hinges 50 are inserted, respectively.

Figure 7A:
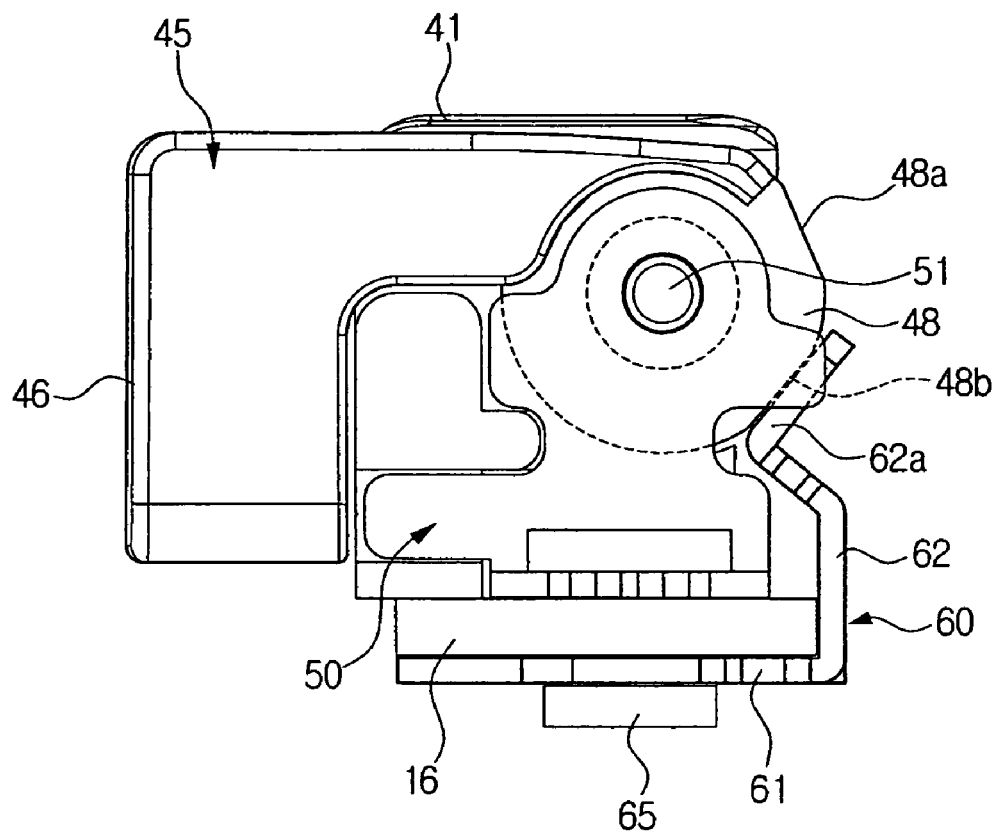
FIG. 7A is a top plan view of a closed memory card slot door unit according to an exemplary embodiment of the present invention.
Figure 7B:
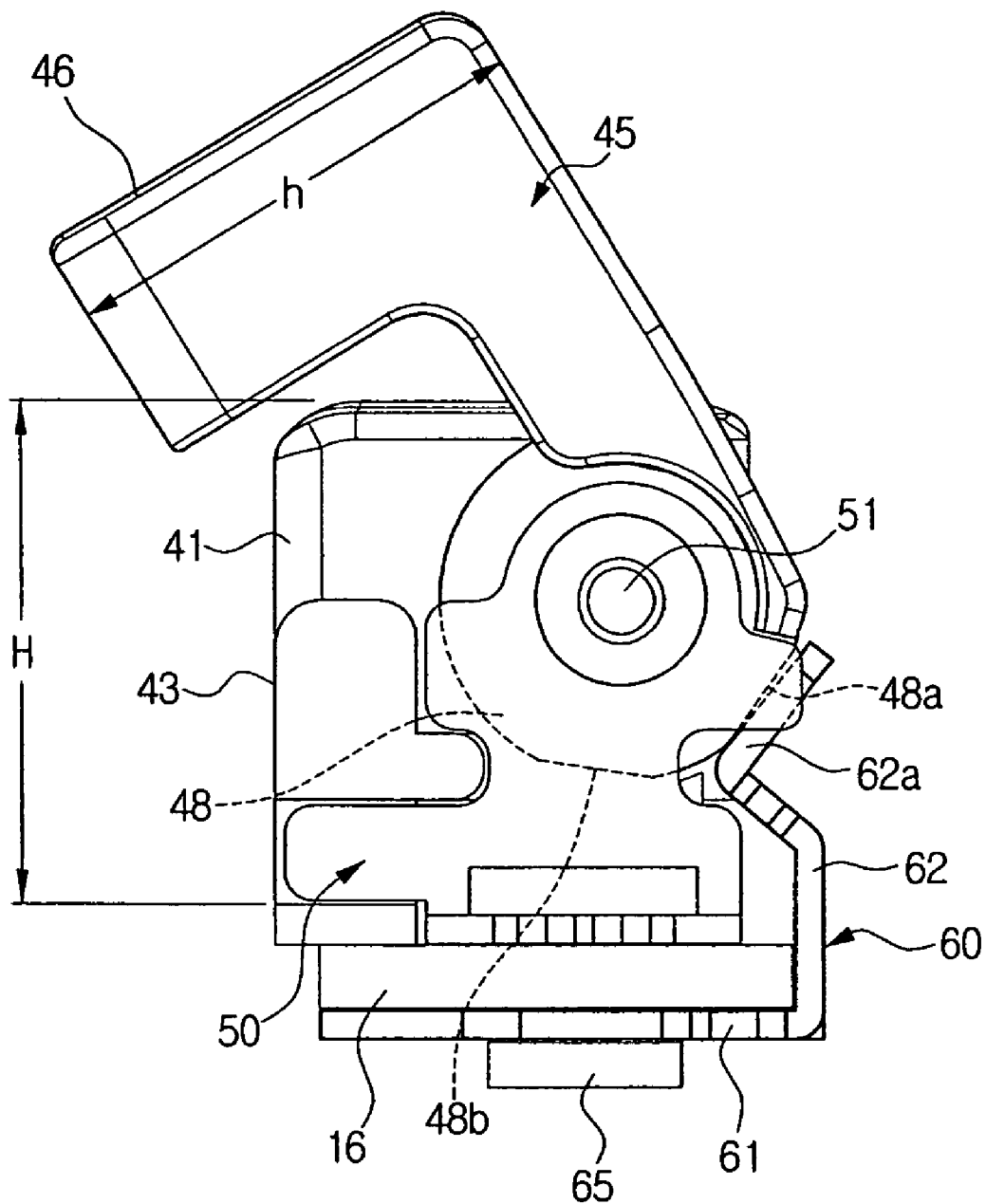
FIG. 7B is a top plan view of an opened memory card slot door unit according to an exemplary embodiment of the present invention.

The door 45 rotates in the height direction (H in FIG. 7B) with respect to the door holder 41, and is formed to selectively block a lead-in opening 43 of the door holder 41. Referring to FIG. 3, the door 45 includes a blocking plate 46 and two pivoting arms 47. The blocking plate blocks the lead-in opening 43 of the door holder 41, ensuring that the memory card is not easily slipped or removed from the memory card slot 30. Two pivoting arms 47 extended from both ends of a blocking plate 46, respectively, and are installed pivotably against the lateral walls 44 of the door holder 41 by the hinges 50. The height h of the door 45 is either equal or less than the height H of the door holder 41 (as shown in FIG. 7B). A hinge unit 48 is formed at the front end portion of the pivoting arms 47. The hinge unit 48 has a hinge hole 49 into which the hinge shaft 51 is inserted. Moreover, a first securing part 48a (FIG. 7A) and a second securing part 48b (FIG. 7B) are formed on the outside of the hinge unit 48. Here, the first securing part 48a temporarily secures the door 45 when the lead-in opening 43 of the door holder 41 is opened, whereas the second securing part 48b temporarily secures the door 45 when the lead-in opening 43 of the door holder 41 is closed. The first and second securing parts 48a and 48b are formed by processing the outer circumference of the hinge unit 48 that comes in contact with the position maintaining members 60 when the door 45 is either opened or closed into a straight line form.

Figure 6:
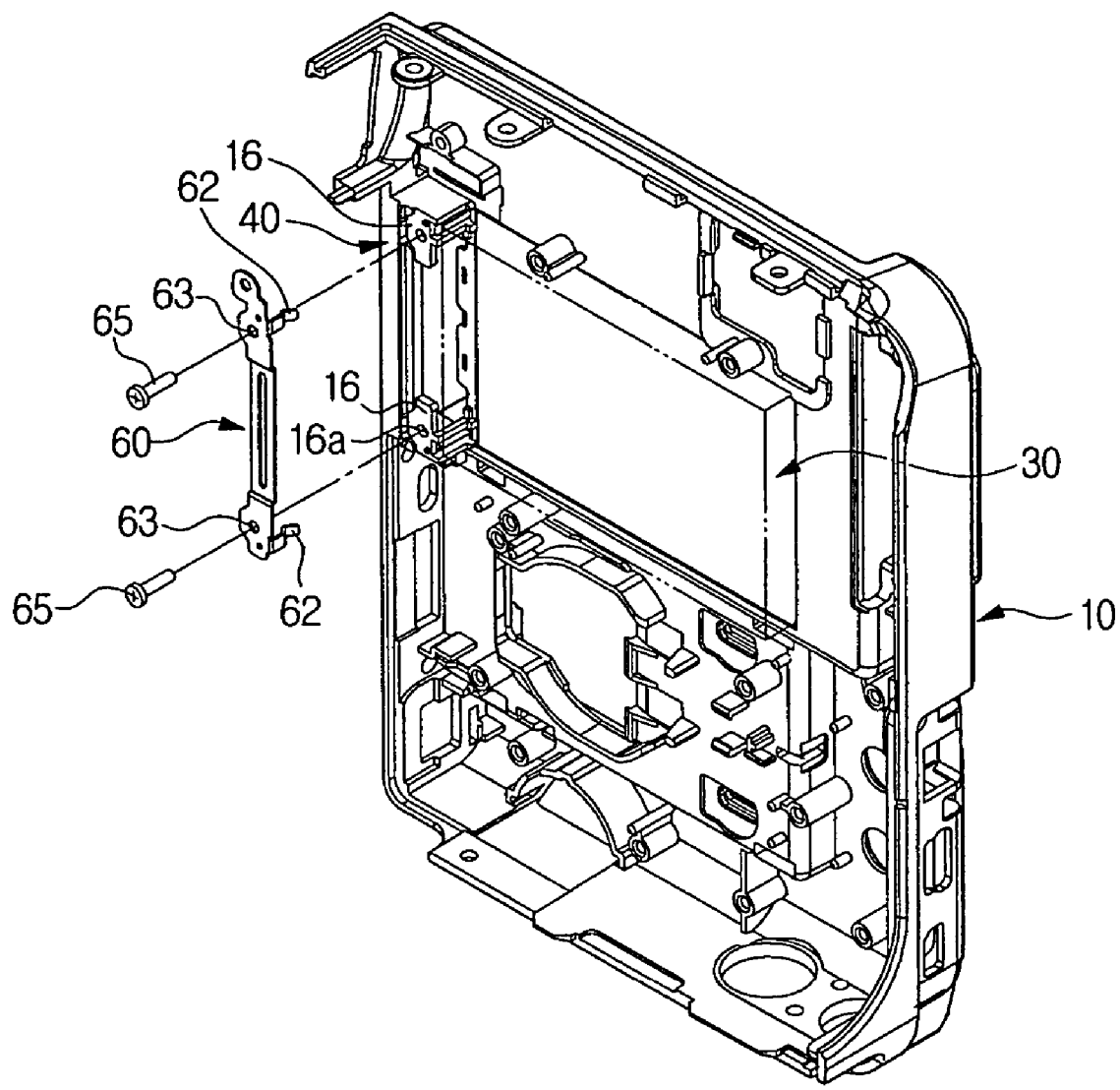
FIG. 6 is an exploded perspective view of a memory card slot door unit according to an exemplary embodiment of the present invention prior to being connected to the main body through position maintaining members.

The hinges 50, which are installed on the lateral walls 44 of the door holder 41, support the door 45 to pivot in the height direction (H in FIG. 7B) with respect to the door holder 41. The lateral walls 44 indicate the walls having shorter sides of the rectangular-shaped door holder 41. Each hinge 50 consists of a hinge shaft 51 and a fixing part 52. The hinge shaft 51 is inserted into a hinge hole 49 and a supporting hole 44a, and supports the door 45 to pivot with respect to the door holder 41. Preferably, the hinge shaft 51 is formed in a manner that a front end 51a thereof does not protrude inside of the door holder 41. The fixing part 52 fixes the door holder 41, the door 45 and the hinges 50 as one unit to the main body 10, and has a fixing hole 53. That is, the memory card slot door 40 is fixed to the main body 10 by fitting the fixing part 52 of the hinge 50 into an assembly hole 16a of an assembly part 16 provided to the opening 15 of the main body 10 by using a locking member 65 (as shown in FIGS. 5 and 6).

The position maintaining members 60 are installed at one side of the two hinges 50, respectively, and facilitate maintaining the door 45 in a predetermined position. For example, when the door 45 is opened, the position maintaining members 60 maintains the door 45 in an opened position until the user closes the door 45. Similarly, when the door 45 is closed, the position maintaining members 60 maintain the door 45 in a closed position until the user opens the door 45. As shown in FIG. 3, the position maintaining member 60 is formed of a base 61 and two elastic protrusions 62. The elastic protrusions 62 are adapted to press the hinge unit 48 of the door 45. A protruded part 62a (as shown in FIG. 7A) of the elastic protrusion 62 preferably presses the first securing part 48a or the second securing part 48b of the hinge unit 48. The base 61 has maintaining holes 63 for fixing the position maintaining member 60 to the main body 10. Two maintaining holes 63 are preferably formed at positions corresponding to the two assembly holes 16a of the opening 15. The position maintaining members 60 and the hinges 50 may be fixed together to the main body 10 by the locking member 65. Moreover, the position maintaining members 60 are preferably molded of metals with a high elasticity so the elastic protrusions 62 may elastically support the hinge unit 48 of the door 45.

Even though it is not shown, the position maintaining member 60 may be formed of a base and one elastic protrusion, instead of two as in the above-described embodiment, as a separate unit. Thus, two position maintaining members are installed, respectively, at the hinges 50 on both sides of the door 45 (that is, one position maintaining member for each hinge).

Even though it is not shown, according to another exemplary embodiment of the memory card slot door, a plurality of hinges may be installed on the lateral walls of the memory card slot to support the rotation of the door, thereby enabling the door to selectively open and close the entrance of the memory card slot. A hinge shaft may be formed on each of the lateral walls of the memory card slot as one unit to support the pivoting motion of the door.

With reference to FIGS. 3, 5 and 6, the following now explains an assembly procedure for assembling the memory card slot door 40 to the main body 10 of the digital mobile apparatus 1.

First, the door holder 41 and the door 45 are assembled such that the blocking plate 46 of the door 45 blocks the lead-in opening 43 of the door holder 41. The hinge shafts 51 of the two hinges 50 are inserted, respectively, into the hinge holes 49 formed on both sides of the door 45 and into the supporting holes 44a formed on both sides of the door holder 41. Then, the memory card slot door 40 is in sub-assembled state. In this state, the door 45 is able to pivot around the hinge shafts 51 with respect to the door holder 41. The sub-assembled memory card slot door 40 is inserted into the opening 15 of the main body 10, as shown in FIG. 5. The fixing hole 53 of the hinge fixing part 52 is brought in line with the assembly hole 16a of the opening 15. Next, the maintaining hole 63 of the position maintaining member 60 is brought in line with the assembly hole 16a of the opening 15 at the rear side of the main body 10, and are fixed by using the locking member 65. Another simple way to fix the memory card slot door 40 to the main body 10 is that, if a female screw is available in the fixing hole 53 of the fixing part 52, the user may put a bolt as the locking member 65 into the maintaining hole 63 of the position maintaining member 60 and into the assembly hole 16a of the opening 15 and then lock the bolt 65 into the fixing hole 53 of the hinge fixing part 52.

More details on the operation of the memory card slot door 40 of the exemplary embodiments of the present invention are now provided below, referring to FIGS. 1, 7A and 7B.

The procedure of inserting the memory card into the memory card slot 30 of the digital mobile apparatus 1 is first explained. The display unit 20 is rotated outwardly so it may be separated from the mounting portion 11 of the main body 10. In this state, when the user pushes the door 45 in the left direction (with respect to the main body in FIG. 1) the door 45 pivots with respect to the hinge shafts 51. Thus, the lead-in opening 43 of the door holder 41 is opened. Then, as shown in FIG. 7B, the first fixing part 48a of the hinge unit 48 of the door 45 is pressed by the elastic protrusions 62 of the position maintaining members 60, and the lead-in opening 43 of the door holder 41 remains opened. In this state, the user may insert a memory card into the lead-in opening 43 of the door holder 41 and mount the memory card at the memory card slot 30. Later, when the user pushes the door 45 in the right direction (with respect to the main body in FIG. 1), the door 45 pivots with respect to the hinge shafts 51. Thus, the lead-in opening 43 of the door holder 41 is closed. Then, as shown in FIG. 7A, the second fixing part 48*b* of the hinge unit 48 of the door 45 is pressed by the elastic protrusions 62 of the position maintaining members 60, and the lead-in opening 43 of the door holder 41 remains closed. When the user moves around while holding the digital mobile apparatus 1, the memory card is kept safely inside the memory card slot 30 and is not easily slipped away or removed.

Because the procedure of taking the memory card out of the memory card slot 30 is exactly the opposite of the above-described procedure, its details are omitted.

Although a digital camcorder was used as an example of the digital mobile apparatus 1, the memory card slot door unit 40 of the invention may equally be applied to other types of digital mobile apparatuses, including, but not limited to, digital cameras, cellular phones, PDAs, portable game machines, and so forth.

The foregoing embodiments and advantages are merely exemplary and are not to be construed as limiting the present invention. The present teaching may be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A memory card slot door unit for a memory card slot formed in a digital mobile apparatus, the memory card slot door unit comprising:
   a door for closing an entrance of the memory card slot;
   a plurality of hinges for supporting a pivoting motion of the door, so that the door selectively opens and closes the entrance of the memory card slot; and
   a door holder connected to a front end portion of the entrance of the memory card slot and having a lead-in opening through which the memory card is inserted in the memory card slot,
   wherein the door is in the closed position when a memory card is in the memory card slot.

2. The door unit according to claim 1, wherein
   the plurality of hinges are installed on lateral walls of the door holder.

3. The door unit according to claim 2, wherein the door includes
   a blocking plate for blocking the lead-in opening of the door holder; and
   a plurality of pivoting arms extending from both ends of the blocking plate, and installed pivotably on the lateral walls of the door holder by the plurality of hinges.

4. The door unit according to claim 1, wherein
   an inner side of the door holder is molded in a shape substantially corresponding to the memory card to be inserted in the memory card slot.

5. The door unit according to claim 1, wherein
   a position maintaining member is installed at each side of each of the plurality of hinges for elastically pressing the hinge unit of the door.

6. The door unit according to claim 5, wherein
   the position maintaining members engage a first portion of the hinge unit to maintain the door in an opened position and engage a second portion of the hinge unit to maintain the door in a closed position.

7. The door unit according to claim 5, wherein
   the position maintaining members are unitarily formed in one body.

8. The door unit according to claim 5, wherein the hinge unit of the door includes
   a first fixing part engaging the position maintaining members in an opened state; and
   a second fixing part engaging the position maintaining members in a closed state.

9. The door unit according to claim 1, wherein
   an inner side of the door holder is molded in a shape adapted to receive a variety of memory card devices.

10. A digital mobile apparatus, comprising:
    a main body;
    a display unit pivotably installed at one side of the main body;
    a memory card slot with an inner side being in contact with a mounting portion of the main body where the display unit is mounted;
    a memory card slot door unit installed at an entrance of the memory card slot for selectively opening and closing the entrance of the memory card slot;
    a door holder installed at the entrance of the memory card slot and having a lead-in opening through which the memory card is inserted in the memory card slot;
    a door for blocking the lead-in opening of the door holder; and
    a plurality of hinges for supporting the pivoting motion of the door with respect to the door holder so that the door selectively opens and closes the lead-in opening,
    wherein the door is in the closed position when a memory card is in the memory card slot.

11. The apparatus according to claim 10, wherein the memory card slot door unit includes
    position maintaining members installed at one side of the plurality of hinges for elastically pressing the hinge unit of the door.

12. The apparatus according to claim 11, wherein the hinge unit of the door includes
    a first fixing part engaging the position maintaining members in an opened state; and
    a second fixing part engaging the position maintaining members in a closed state.

13. The apparatus according to claim 10, wherein the door includes
    a blocking plate for blocking the lead-in opening of the door holder; and
    a plurality of pivoting arms extending from both ends of the blocking plate and installed pivotably on the lateral walls of the door holder by the plurality of hinges.

14. The apparatus according to claim 10, wherein
    the door holder and the door are fixed to the main body by the plurality of hinges.

15. The door unit according to claim 10, wherein
    an inner side of the door holder is molded in a shape substantially corresponding to the memory card to be inserted in the memory card slot.

16. The door unit according to claim 10, wherein
    an inner side of the door holder is molded in a shape adapted to receive a variety of memory card devices.

17. A memory card slot door unit for a memory card slot formed in a digital mobile apparatus, the memory card slot door unit comprising:
    a door for closing an entrance of the memory card slot;
    a plurality of hinges for supporting a pivoting motion of the door, so that the door selectively opens and closes the entrance of the memory card slot; and a position maintaining member installed at each side of each of the plurality of hinges for elastically pressing the hinge unit of the door, wherein the door is in the closed position when a memory card is in the memory card slot.

18. The door unit according to claim 17, wherein a door holder is connected to a front end portion of the entrance of the memory card slot and has a lead-in opening through which the memory card is inserted in the memory card slot; and the plurality of hinges are installed on lateral walls of the door holder.

19. The door unit according to claim 18, wherein the door includes a blocking plate for blocking the lead-in opening of the door holder; and a plurality of pivoting arms extending from both ends of the blocking plate, and installed pivotably on the lateral walls of the door holder by the plurality of hinges.

20. The door unit according to claim 18, wherein an inner side of the door holder is molded in a shape substantially corresponding to the memory card to be inserted in the memory card slot.

21. The door unit according to claim 18, wherein an inner side of the door holder is molded in a shape adapted to receive a variety of memory card devices.

22. The door unit according to claim 17, wherein the position maintaining members engage a first portion of the hinge unit to maintain the door in an opened position and engage a second portion of the hinge unit to maintain the door in a closed position.

23. The door unit according to claim 17, wherein the position maintaining members are unitarily formed in one body.

24. The door unit according to claim 17, wherein the hinge unit of the door includes a first fixing part engaging the position maintaining members in an opened state; and a second fixing part engaging the position maintaining members in a closed state.

* * * * *